United States Patent
Urbanski et al.

(10) Patent No.: US 11,418,524 B2
(45) Date of Patent: Aug. 16, 2022

(54) SYSTEMS AND METHODS OF HIERARCHICAL BEHAVIOR ACTIVITY MODELING AND DETECTION FOR SYSTEMS-LEVEL SECURITY

(71) Applicant: Secureworks Corp., Wilmington, DE (US)

(72) Inventors: William M. Urbanski, Whitefish, MT (US); Timothy M. Vidas, Omaha, NE (US); Kyle Soeder, Chesapeake, VA (US); Jon Ramsey, Atlanta, GA (US); Robert William Danford, Davis, CA (US); Aaron Hackworth, Johns Creek, GA (US)

(73) Assignee: SecureworksCorp., Wilmington, DE (US)

( * ) Notice: Subject to any disclaimer, the term of this patent is extended or adjusted under 35 U.S.C. 154(b) by 498 days.

(21) Appl. No.: 16/405,788

(22) Filed: May 7, 2019

(65) Prior Publication Data
US 2020/0358795 A1    Nov. 12, 2020

(51) Int. Cl.
*H04L 9/40*     (2022.01)
*G06N 20/00*    (2019.01)
*G06N 7/00*     (2006.01)

(52) U.S. Cl.
CPC ......... *H04L 63/1425* (2013.01); *G06N 7/005* (2013.01); *G06N 20/00* (2019.01); *H04L 63/1433* (2013.01); *H04L 63/1441* (2013.01)

(58) Field of Classification Search
CPC ............... G06F 21/316; H04L 63/1425; H04L 63/1441; G06N 20/00; G06N 7/005
See application file for complete search history.

(56) References Cited

U.S. PATENT DOCUMENTS

| | | |
|---|---|---|
| 5,937,066 A | 8/1999 | Gennaro |
| 6,357,010 B1 | 3/2002 | Viets et al. |
| | (Continued) | |

FOREIGN PATENT DOCUMENTS

| | | |
|---|---|---|
| EP | 3599753 A1 | 1/2020 |
| RU | 2738344 C1 | 12/2020 |
| | (Continued) | |

OTHER PUBLICATIONS

Buyukkayhan, Ahmet Sali; Oprea, Alina; Li, Zhou; and Robertson, William; "*Lens on the endpoint; Hunting for malicious software through endpoint data analysis*"; International Symposium on Research in Attacks, Intrusions, and Defenses; RAID 2017: Research in Attacks, Intrusions, and Defenses Proceedings; pp. 73-79; Sep. 18-20, 2017; Atlanta, GA, USA.

(Continued)

*Primary Examiner* — Thaddeus J Plecha
(74) *Attorney, Agent, or Firm* — Womble Bond Dickinson (US) LLP

(57) ABSTRACT

The present disclosure provides systems and methods for detection of one or more security threats or malicious actions. According to the present disclosure, data can be received from one or more data producers and provided to a behavior processor. The behavior processor extracts, identifies, or detects one or more behaviors from the data based on one or more datum, features, or characteristics included therein, and provides the one or more identified behaviors to a tactic processor. The tactic processor extracts, identifies, or detects one or more tactics based on the one or more identified behaviors, and submits the one or more identified tactics to a tactic classifier to determine whether the one or more identified tactics are indicative of the one or more security threats or malicious actions. Other aspects are also described.

20 Claims, 9 Drawing Sheets

(56) References Cited

U.S. PATENT DOCUMENTS

| | | |
|---|---|---|
| 7,269,578 B2 | 9/2007 | Sweeney |
| 7,331,061 B1 | 2/2008 | Ramsey et al. |
| 7,492,957 B1 | 2/2009 | Bonhaus |
| 7,548,932 B2 | 6/2009 | Horvitz et al. |
| 7,555,482 B2 | 6/2009 | Korkus |
| 7,571,474 B2 | 8/2009 | Ross et al. |
| 7,594,270 B2 | 9/2009 | Church et al. |
| 7,606,801 B2 | 10/2009 | Faitelson et al. |
| 7,613,722 B2 | 11/2009 | Horvitz et al. |
| 7,770,031 B2 | 8/2010 | MacKay et al. |
| 7,856,411 B2 | 12/2010 | Darr |
| 8,079,081 B1 | 12/2011 | Lavrik et al. |
| 8,122,495 B2 | 2/2012 | Ramsey et al. |
| 8,156,553 B1 | 4/2012 | Church et al. |
| 8,327,419 B1 | 12/2012 | Korablev |
| 8,407,335 B1 | 3/2013 | Church et al. |
| 8,490,193 B2 | 7/2013 | Sarraute et al. |
| 8,490,196 B2 | 7/2013 | Lucangeli et al. |
| 8,522,350 B2 | 8/2013 | Davenport et al. |
| 8,539,575 B2 | 9/2013 | Schmitlin et al. |
| 8,578,393 B1 | 11/2013 | Fisher |
| 8,595,170 B2 | 11/2013 | Gladstone et al. |
| 8,621,618 B1 | 12/2013 | Ramsey et al. |
| 8,701,176 B2 | 4/2014 | Ramsey et al. |
| 8,805,881 B2 | 8/2014 | Hom et al. |
| 8,832,048 B2 | 9/2014 | Lim |
| 8,839,414 B2 | 9/2014 | Mantle et al. |
| 8,898,777 B1 | 11/2014 | Oliver |
| 8,909,673 B2 | 12/2014 | Faitelson et al. |
| 8,931,095 B2 | 1/2015 | Ramsey et al. |
| 8,938,802 B2 | 1/2015 | Davenport et al. |
| 8,959,115 B2 | 2/2015 | Marathe |
| 8,984,644 B2 | 3/2015 | Oliphant et al. |
| 9,009,828 B1 | 4/2015 | Ramsey et al. |
| 9,032,478 B2 | 5/2015 | Ballesteros et al. |
| 8,928,476 B2 | 6/2015 | Jerhotova et al. |
| 9,046,886 B2 | 6/2015 | Chong et al. |
| 9,047,336 B2 | 6/2015 | Hom et al. |
| 9,069,599 B2 | 6/2015 | Martinez et al. |
| 9,098,702 B2 | 8/2015 | Rubin et al. |
| 9,129,105 B2 | 9/2015 | Donley et al. |
| 9,130,988 B2 | 9/2015 | Seifert et al. |
| 9,137,262 B2 | 9/2015 | Qureshi |
| 9,298,895 B2 | 3/2016 | Lim |
| 9,319,426 B2 | 4/2016 | Webb et al. |
| 9,338,134 B2 | 5/2016 | Yin |
| 9,338,180 B2 | 5/2016 | Ramsey et al. |
| 9,430,534 B2 | 8/2016 | Bhattacharya et al. |
| 9,438,563 B2 | 9/2016 | Yin |
| 9,519,756 B2 | 12/2016 | Bitran et al. |
| 9,544,273 B2 | 1/2017 | Fleury |
| 9,548,994 B2 | 1/2017 | Pearcy |
| 9,558,352 B1 | 1/2017 | Dennison et al. |
| 9,560,062 B2 | 1/2017 | Khatri et al. |
| 9,560,068 B2 | 1/2017 | Figlin et al. |
| 9,596,252 B2 | 3/2017 | Coates et al. |
| 9,628,511 B2 | 4/2017 | Ramsey et al. |
| 9,667,656 B2 | 5/2017 | Banerjee et al. |
| 9,667,661 B2 | 5/2017 | Sharma et al. |
| 9,710,672 B2 | 7/2017 | Braun |
| 9,742,559 B2 | 8/2017 | Christodorescu |
| 9,767,302 B2 | 9/2017 | Lim |
| 9,805,202 B2 | 10/2017 | Medeiros et al. |
| 9,910,986 B1 | 3/2018 | Saxe |
| 9,973,524 B2 | 5/2018 | Boyer |
| 10,050,992 B2 | 8/2018 | Thyni |
| 10,116,500 B1 | 10/2018 | Long |
| 10,311,231 B1 | 6/2019 | Kayyoor |
| 10,356,125 B2 | 7/2019 | Goutal et al. |
| 10,382,489 B2 | 8/2019 | Das |
| 10,419,903 B2 | 9/2019 | Singh et al. |
| 10,425,223 B2 | 9/2019 | Roth |
| 10,474,820 B2 | 11/2019 | Manadhata |
| 10,491,632 B1 | 11/2019 | Natarajan |
| 10,567,407 B2 | 2/2020 | Tang et al. |
| 10,601,865 B1 | 3/2020 | Mesdaq et al. |
| 10,728,263 B1* | 7/2020 | Neumann ............ H04L 63/145 |
| 10,762,206 B2 | 9/2020 | Titonis et al. |
| 10,834,128 B1 | 11/2020 | Rajogopalan et al. |
| 10,853,431 B1 | 12/2020 | Lin et al. |
| 10,915,828 B2 | 2/2021 | Qhi |
| 2002/0129135 A1 | 9/2002 | Delany et al. |
| 2005/0138204 A1 | 6/2005 | Iyer et al. |
| 2005/0288939 A1 | 12/2005 | Peled et al. |
| 2006/0012815 A1 | 1/2006 | Edner |
| 2006/0037076 A1 | 2/2006 | Roy |
| 2006/0195575 A1 | 8/2006 | Delany et al. |
| 2006/0253447 A1 | 11/2006 | Judge |
| 2007/0022624 A1 | 9/2007 | Darr |
| 2007/0226807 A1 | 9/2007 | Ginter et al. |
| 2008/0077593 A1 | 3/2008 | Abrams et al. |
| 2008/0219334 A1 | 9/2008 | Brainos |
| 2008/0255997 A1 | 10/2008 | Bluhm |
| 2008/0262991 A1 | 10/2008 | Kapoor |
| 2008/0320000 A1 | 12/2008 | Gaddam |
| 2009/0198682 A1 | 8/2009 | Buehler et al. |
| 2010/0083374 A1 | 4/2010 | Schmitlin et al. |
| 2010/0125913 A1 | 5/2010 | Davenport et al. |
| 2011/0004771 A1 | 1/2011 | Matsushima |
| 2011/0179492 A1 | 7/2011 | Markopoulou |
| 2011/0276604 A1 | 11/2011 | Hom et al. |
| 2011/0276716 A1 | 11/2011 | Coulson |
| 2012/0117640 A1 | 5/2012 | Ramsey et al. |
| 2012/0185275 A1 | 7/2012 | Loghmani |
| 2012/0246730 A1 | 9/2012 | Raad |
| 2012/0254333 A1 | 10/2012 | Chandramouli |
| 2012/0260341 A1 | 10/2012 | Chan et al. |
| 2013/0104191 A1 | 4/2013 | Peled et al. |
| 2013/0138428 A1 | 5/2013 | Chandramouli |
| 2013/0173620 A1 | 7/2013 | Takenouchi |
| 2013/0226938 A1 | 8/2013 | Risher et al. |
| 2013/0238319 A1 | 9/2013 | Minegishi et al. |
| 2013/0282746 A1 | 10/2013 | Balko |
| 2013/0291103 A1 | 10/2013 | Davenport et al. |
| 2013/0318604 A1 | 11/2013 | Coates et al. |
| 2014/0041028 A1 | 2/2014 | Ramsey et al. |
| 2014/0047544 A1 | 2/2014 | Jakobsson |
| 2014/0051432 A1 | 2/2014 | Gupta |
| 2014/0222712 A1 | 8/2014 | Samaha |
| 2014/0373151 A1 | 12/2014 | Webb et al. |
| 2015/0193231 A1 | 1/2015 | Goldberg |
| 2015/0040225 A1 | 2/2015 | Coates et al. |
| 2015/0074390 A1 | 3/2015 | Stoback |
| 2015/0135287 A1 | 5/2015 | Medeiros et al. |
| 2015/0156212 A1 | 6/2015 | Khatri et al. |
| 2015/0186618 A1 | 7/2015 | Poorvin |
| 2015/0222652 A1 | 8/2015 | Ramsey et al. |
| 2015/0271047 A1 | 9/2015 | McLean |
| 2015/0324457 A1 | 11/2015 | McLean |
| 2016/0014140 A1 | 1/2016 | Akireddy |
| 2016/0014151 A1 | 1/2016 | Prakash |
| 2016/0078365 A1 | 3/2016 | Baumard |
| 2016/0099963 A1 | 4/2016 | Mahaffey |
| 2016/0139886 A1 | 5/2016 | Perdriau |
| 2016/0182546 A1 | 6/2016 | Coates et al. |
| 2016/0241591 A1 | 8/2016 | Ramsey et al. |
| 2016/0277423 A1* | 9/2016 | Apostolescu ......... G06F 21/566 |
| 2016/0313709 A1 | 10/2016 | Biesdorf |
| 2016/0337400 A1 | 11/2016 | Gupta |
| 2016/0342805 A1 | 11/2016 | Lim |
| 2016/0378978 A1 | 12/2016 | Singla |
| 2017/0026343 A1 | 1/2017 | Wardman |
| 2017/0063893 A1 | 3/2017 | Franc et al. |
| 2017/0098087 A1 | 4/2017 | Li |
| 2017/0111379 A1 | 4/2017 | Khatri et al. |
| 2017/0140295 A1 | 5/2017 | Bandara |
| 2017/0142149 A1 | 5/2017 | Coates et al. |
| 2017/0169154 A1 | 6/2017 | Lin et al. |
| 2017/0171228 A1 | 6/2017 | McLean |
| 2017/0180418 A1 | 6/2017 | Shen |
| 2017/0201381 A1 | 7/2017 | Kinder et al. |
| 2017/0201431 A1 | 7/2017 | Kinder et al. |
| 2017/0201490 A1 | 7/2017 | Kinder et al. |
| 2017/0201548 A1 | 7/2017 | Kinder et al. |

(56) References Cited

U.S. PATENT DOCUMENTS

| | | | |
|---|---|---|---|
| 2017/0243004 | A1 | 8/2017 | Kinder et al. |
| 2017/0243005 | A1 | 8/2017 | Kinder et al. |
| 2017/0244734 | A1 | 8/2017 | Kinder et al. |
| 2017/0244750 | A1 | 8/2017 | Kinder et al. |
| 2017/0244754 | A1 | 8/2017 | Kinder et al. |
| 2017/0244762 | A1 | 8/2017 | Kinder et al. |
| 2017/0318034 | A1 | 11/2017 | Holland |
| 2017/0359368 | A1 | 12/2017 | Hodgman |
| 2018/0077189 | A1 | 3/2018 | Doppke |
| 2018/0089574 | A1 | 3/2018 | Goto |
| 2018/0091306 | A1 | 3/2018 | Antonopoulos |
| 2018/0124073 | A1 | 5/2018 | Scherman |
| 2018/0124085 | A1 | 5/2018 | Frayman |
| 2018/0152480 | A1 | 5/2018 | Kinder et al. |
| 2018/0181599 | A1 | 6/2018 | Crabtree |
| 2018/0288198 | A1 | 10/2018 | Pope et al. |
| 2018/0367550 | A1 | 12/2018 | Musuvathi |
| 2019/0037406 | A1 | 1/2019 | Wash |
| 2019/0141491 | A1 | 1/2019 | Cleveland et al. |
| 2019/0050554 | A1 | 2/2019 | Fiske |
| 2019/0095801 | A1 | 3/2019 | Saillet |
| 2019/0102646 | A1 | 4/2019 | Redmon |
| 2019/0104154 | A1 | 4/2019 | Kumar et al. |
| 2019/0122258 | A1 | 4/2019 | Bramberger et al. |
| 2019/0132344 | A1 | 5/2019 | Lem et al. |
| 2019/0141079 | A1 | 5/2019 | Vidas et al. |
| 2019/0149564 | A1 | 5/2019 | McLean |
| 2019/0173919 | A1 | 6/2019 | Irimie |
| 2019/0297096 | A1* | 9/2019 | Ahmed ............... H04L 63/1425 |
| 2019/0342296 | A1 | 11/2019 | Anandam |
| 2019/0377832 | A1 | 12/2019 | McLean et al. |
| 2019/0379678 | A1 | 12/2019 | McLean et al. |
| 2020/0036750 | A1 | 1/2020 | Bahnsen |
| 2020/0195683 | A1* | 6/2020 | Kuppa ................. G06N 3/0454 |
| 2020/0259791 | A1 | 8/2020 | Garcia et al. |
| 2020/0336497 | A1* | 10/2020 | Seul ....................... G06F 17/15 |
| 2020/0351302 | A1 | 11/2020 | Kyle |
| 2020/0356665 | A1 | 11/2020 | Denney et al. |
| 2020/0358819 | A1 | 11/2020 | Bowditch et al. |
| 2020/0364338 | A1 | 11/2020 | Ducau et al. |
| 2021/0112087 | A1 | 4/2021 | Tassoumt |
| 2021/0226970 | A1* | 7/2021 | Ross ..................... G06F 21/566 |

FOREIGN PATENT DOCUMENTS

| | | | |
|---|---|---|---|
| WO | WO2007002749 | A2 | 1/2007 |
| WO | WO2007090605 | A1 | 8/2007 |
| WO | WO2010059843 | A2 | 5/2010 |
| WO | WO2021/067238 | A1 | 4/2021 |

OTHER PUBLICATIONS

Secureworks—Log Management—Protect your infrastructure from known and emerging threats; www.secureworks.com/resources/ds-log-management; 2015 (available).

Sofya Raskhodnikova & Adam Smith; CSE 598A Algorithmic Challenges in Data Privacy; Lecture 2; Jan. 19, 2010.

International Search Report and the Written Opinion of the International Search Authority for PCT/US2020/015001, dated Apr. 17, 2020.

Afroz, S. and Greenstadt, R. "PhishZoo: Detecting Phishing Websites by Looking at Them"; IEEE Fifth International Conference on Semantic Computing, 2011; pp. 368-375; doi: 10.1109/ICSC.2011.52; 2011.

Alkhawlani, Mohammed, Elmogy, Mohammed and Elbakry, Hazem; "Content-based image retrieval using local features descriptors and bag-of-visual words"; International Journal of Advanced Computer Science and Applications, vol. 6 No. 9 2015; pp. 212-219; 2015.

Buber, E., Demir, O. and Sahingoz, O.K.; "Feature selections for the machine learning based detection of phishing websites"; 2017 International Artificial Intelligence and Data Processing Symposium (IDAP), 2017; pp. 1-5; doi: 10.1109/DAP.2017.8090317; 2017.

Lin, Tsung-Yi, et al.; "Microsoft coco: Common objects in context"; European Conference on Computer Vision, Springer, Cham, 2014; 2014.

Liu, Y., Wang, Q., Zhuang, M. and Zhu, Y.; Reengineering Legacy Systems with RESTFul Web Service; 2008 $32^{nd}$ Annual IEEE International Computer Software and Applications Conference, 2008; pp. 785-790; doi: 10.1109/COMPSAC.2008.89; 2008.

White, Joshua S., Matthews, Jeanna N., and Stacy, John L.; A method for the automated detection phishing websites through both site characteristics and image analysis Cyber Sensing 2012; vol. 8408; International Society for Optics and Photonics, 2012; 2012.

URLVoid; URLVoid.com; retrieved from archives.org: https:web.archive.org/web/20180730215132/https.://www.urlvoid.com/); Published Jul. 30, 2018.

\* cited by examiner

SYSTEMS AND METHODS OF HIERARCHICAL BEHAVIOR ACTIVITY MODELING AND DETECTION FOR SYSTEMS-LEVEL SECURITY

BACKGROUND

In information processing, computing, and/or networked systems, adversarial (e.g., "malicious" or "threat") actors are constantly at odds with system defenders, such as managed security service providers ("MSSPs"), security researchers, etc. Adversarial actors regularly incorporate technical and operational changes throughout various levels of abstraction in order to avoid detection or reaction by the defenders. That is, adversarial actors may often try to use tools or techniques and/or to implement changes that do not readily appear malicious. These changes generally are apparent to victims or security defenders only after considerable time has lapsed following a given observable event, and security defenders may not become aware of new technology/tactics employed by an adversarial actor until after an incident has occurred and a lengthy incident response procedure, e.g., involving digital forensics, is conducted. Prevention technologies also generally operate on lower levels of abstraction in many security-oriented detection methods, such as classically scanning for precise instances of malicious software (or "malware") or particular sub-components of malware. Therefore, even small changes made by adversarial actors, at times, can alter the malware sufficiently to evade such stringent detection methodologies. Furthermore, changes benefiting adversarial actors typically outpace compensating changes made by security defenders, increasing the difficulty for defenders to prevent serious harm caused by adversarial actors. When a security-oriented technology operates on these lower levels of abstraction, related detections are typically narrowly scoped, sometimes obscuring other potentially relevant observations or information.

Accordingly, it can be seen that a need exists for more robust detection systems and methods that operate at higher levels of abstraction and more resilient to lower level changes implemented by adversarial actors; are able to incorporate context from related information; and further are able to predict previously unseen/undetected changes implemented by adversarial actors. The present disclosure is directed to the foregoing and other related, and unrelated, problems/issues in the art.

SUMMARY

Briefly described, according to various aspects, the present disclosure is directed to systems and methods that operate on data or data sets provided, developed, or obtained from a variety of data sources and models or analyses this data or data sets into abstract representations of actions to detect or classify actions taken directly or indirectly by adversarial actors. These representations generally are hierarchical in nature, beginning with structured and unstructured data external to a system, modeling lower-order "behaviors," detecting sequences of higher-order behaviors (referred to as tactics), and ultimately classifying a subset of behaviors or tactics as belonging to adversarial actors.

In one embodiment, the present disclosure can provide a system for detection of one or more security threats or malicious actions. The system can comprise one or more processors and at least one memory having stored therein a plurality of instructions that when executed by one or more processors implement one or more components configured to classify behaviors or tactics as belonging to adversarial actors. The system can include one or more components configured to receive data or data sets from one or more data producers, and provide the data or data sets to a behavior processor. The data or data sets can include system logs, user metadata, infrastructure data, etc., or other suitable security relevant data.

The behavior processor can be configured to extract and/or identify one or more behaviors from the data or data sets based on one or more datum, features, or characteristics included therein. The behavior processor further can provide the one or more extracted or identified behaviors to a tactic processor. In some variations, the behavior processor further can be configured to extract and/or identify one or more additional or composite behaviors based on the identified behaviors.

In one embodiment, the behavior processor also can be configured to map (e.g., using stream mapping, regular expression type mapping, etc.) the one or more datum, features, or characteristics included in the data or data sets against known behaviors stored in a behavior data store. The one or more identified or extracted tactics further can be provided to the behavior processor for further development of the behavior processor.

The tactic processor can be configured to extract or identify one or more tactics based on the one or more extracted or identified behaviors, and will submit these one or more identified tactics to a tactic classifier. In some variations, the tactic processor also can be configured to extract or identify one or more additional or composite tactics based on the one or more extracted or identified behaviors and the one or more extracted or identified tactics, and the behavior processor further can be configured to extract or identify one or more behaviors based on extracted or identified tactics.

In one embodiment, the tactic processor is configured to map (e.g., using stream mapping, regular expression type mapping, etc.) the one or more identified or extracted behaviors against known tactics stored in a tactic data store.

The tactic processor advances the identified or extracted tactics to the tactic classifier, and the tactic classifier receives the extracted or identified tactics and determines whether the one or more identified or extracted tactics are indicative of one or more security threats or malicious actions. The tactic classifier can include a statistical model, a machine learning model or any suitable/reliable supervised or unsupervised learning algorithms, models, etc., without departing from the scope of the present disclosure.

In some variations, the system can generate an alert or alarm to notify a user of a security threat or malicious action if the one or more identified tactics are determined to be indicative of one or more security threats or malicious actions.

In one embodiment, the present disclosure also can include a method for detection of one or more security threats or malicious actions. The method can include receiving data or data sets from one or more data producers, and providing the data or data sets to a behavior processor. The method also can include extracting or identifying, by the behavior processor, one or more behaviors from the data or data sets based on one or more datum, features, or characteristics included in the data or data sets, and providing the one or more extracted or identified behaviors to a tactic processor. Thereafter, the method can include extracting or identifying, by the tactic processor, one or more tactics based on the one or more extracted or identified behaviors, and submitting the one or more identified tactics to a tactic classifier, e.g., including a statistical or machine learning model. Further, the method can include determining, by the tactic classifier, whether the one or more identified tactics are indicative of the one or more security threats or malicious actions, and in some variations, the method can include generating alerts, alarms, etc. if the identified tactics represent security threats or malicious actions.

Various objects, features and advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As shown in FIGS. 1-6B, the present disclosure includes systems and methods for hierarchical behavior activity modeling and detection for systems-level security. For example, data or data sets from external sources (e.g. operating system logs, network device logs, netflow records, endpoint security records, infrastructure audit logs, etc.) can be received/obtained and interpreted, analyzed, modeled, etc. to determine if the data or data sets include one or more sequences of data relating to or from data sources that are likely to have been produced due to actions taken by adversarial/threat actors.

Figure 1:
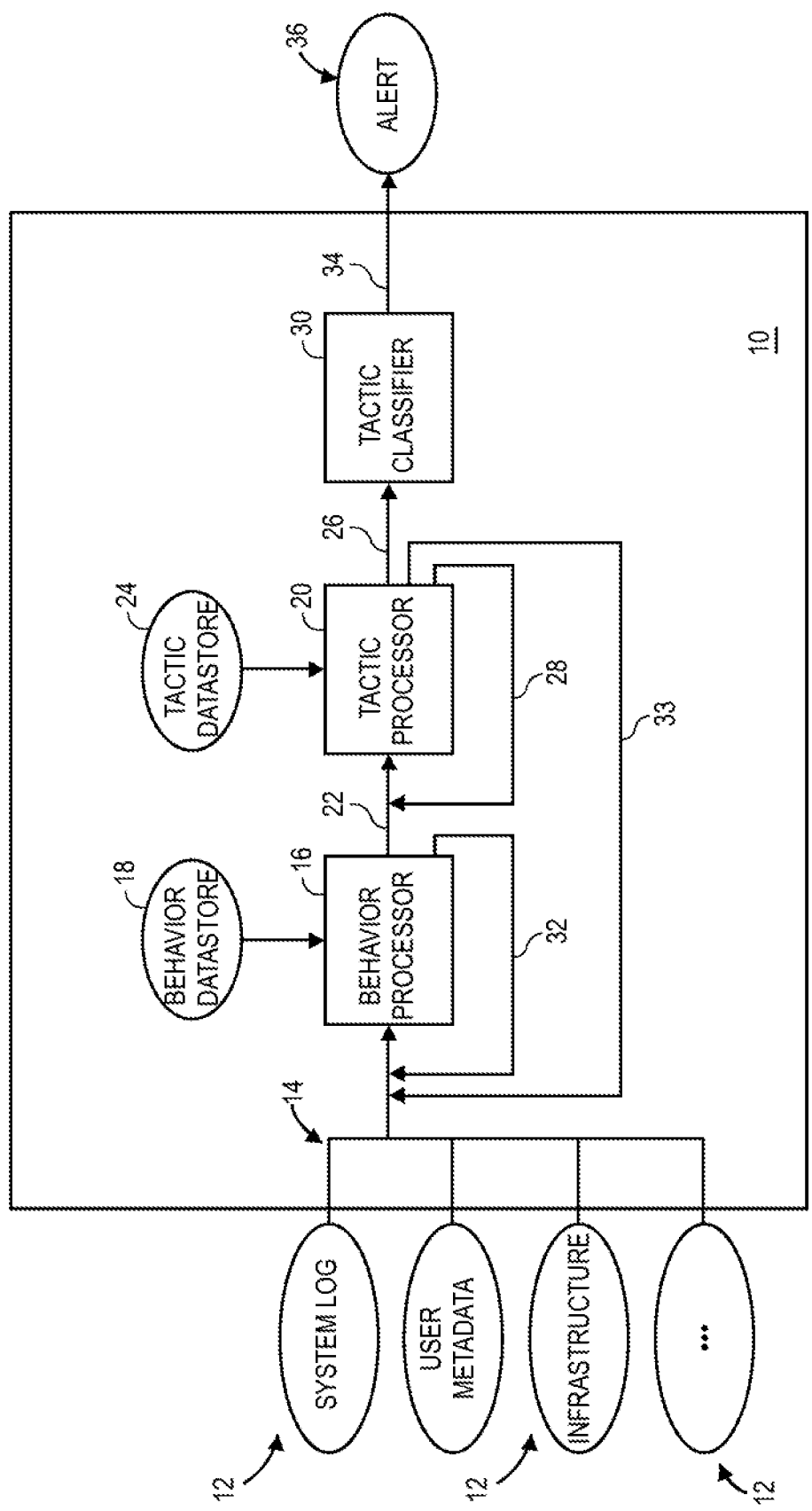
FIG. 1 shows a system for hierarchical behavior activity modeling and/or detection for systems-level security according to principles of the present disclosure.

FIG. 1 shows a schematic depiction of a system 10 for modeling or detection of security threats or malicious actions. As shown in FIG. 1, data-producers 12 create data or data sets and provide such data or data sets as one or more inputs 14 to the system 10. FIG. 1 shows that data may be provided in various forms by the plurality of data producers 12, including, but not limited to, system logs, user metadata, infrastructure data, etc., or other suitable data or information from external or internal data producers. The data producers 12 may share a common implementation but can be operated by a plurality of entities. Single entities also may operate a plurality of data producers with differing implementations.

It further will be generally understood that all data depicted and described herein can be segmented into the smallest meaningful datum, feature, or characteristic for each respective source. Typically, datum, features, or characteristics can include a granular amount of information that constitutes the occurrence of a single, discrete event produced or observed by the source data producer 12. For example, endpoint security technologies may emit data for every process executed on a host; firewall technologies may emit data for communications that are blocked/not blocked; while networking technologies may emit data for network "flows," etc.

In one embodiment, a preprocessor (such as preprocessor 50 shown in FIG. 2A) may be used to normalize such data into a more general class or type (e.g. endpoint, firewall, IDS, etc.) of data. The types of data generally can be source-specific, and various ones of the data-providers 12 may emit multiple types of data. Embodiments of the present disclosure may operate on various groupings, encodings, formats, or representations, without departing from the scope of the present disclosure.

As additionally indicated in FIG. 1, the system 10 includes one or more behavior processors 16 that consume the incoming data 12, process sequences of the data, and identify, extract, or detect datum, features, characteristics, or sequences thereof that match known behaviors, such as known behaviors stored as records in a behavior data store 18 in communication with the behavior processor 16. Behaviors may be comprised of a single datum, or an ordered set of behavior components ordered chronologically or procedurally. The behavior processor 16 can be configured to map or match one or more datum, features, or characteristics, or sequences of the data or data set 12 against known behaviors (or datum, features, or characteristics thereof) stored as records in the behavior data store 18. In some variations, the behavior processor 16 can employ stream matching, regular expression type matching, etc.; however, the records in the behavior data store 18 may be used to identify, extract, or detect behaviors using any suitable mapping or ontology, processing with another subsystem, process or analytic, and/or via contextual understanding of the environment or similar metadata relating to a data-provider, etc., without departing form the scope of the present disclosure.

According to embodiments of the present disclosure, the records in the behavior data store 18 may represent singular actions constituting specific or discrete changes to an operating system. The identification of behaviors may depend upon specific criteria relating to a datum, feature, or characteristic in the received data or data sets. In one example, a datum from an external operating system or endpoint security log denoting the creation of a particular Microsoft Windows® Registry key can indicate that a behavior of a known process was executed on an information handling system or device. In another example, in a netflow datum received from an external network device log identifying a computer initiating an outbound network connection to known, hostile infrastructure can indicate a data exfiltration or a command-and-control behavior. In yet another example, an indication e.g., from one or more log sources, that a user logged in to or accessed a specific webpage, email account, etc., can be indicative of a behavior. Furthermore, behaviors can include generic behaviors that represent various, different types of specific activities that get flagged as a single behavior, such as executing different system utilities, running various system tools, scanning for various network devices, etc.

FIG. 1 additionally shows that the system 10 also includes a tactic processor 20 that receives the identified behaviors 22 to identify, extract, or detect sequences of known tactics stored in a tactic data store 24 based thereon. The tactic processor 20 can be configured to identify, extract, or detect one or more known tactics based on the identified behaviors, e.g., by mapping or matching the identified behaviors against known tactics stored as records in the tactic data store 24. In some variations, the tactic processor 20 can employ or use stream matching or regular expression type matching, though other suitable/reliable matching or mapping methods or other ontologies for identifying, extracting, or detecting known tactics from the records in the tactic data store 24 can be used or employed, without departing from the scope of the present disclosure.

The records or information in the behavior data store 18 and the tactic data store 24 generally include machine readable representations of known behaviors and known tactics, respectively. The behavior data store 18 and the tactic data store 24 can include any suitable data stores, such as databases (e.g., relational databases, such as DBMS, RDMS, RDBMS, etc.), indices, files (e.g., spreadsheets, .txt files, etc.), etc., or other suitable data stores without departing from the scope of the present disclosure. It further will be understood that behaviors and tactics are not necessarily inherently unique to any particular individual, group, and/or technology (e.g., many tactics may be employed by more than one adversarial actor); however the behaviors and tactics sometimes may be indicative of specific actions or tradecraft of certain adversarial actors, such as adversarial actors that may repeatedly employ particular tools and/or procedures.

According to embodiments of the present disclosure, records in the tactic data store 24 are representations of tactics which are ordered sets of known behaviors ordered chronologically or according to some other semantic relationship, such as parent-child, network port source and destination match, etc., or other suitable relationships. The tactic processor 20 thus can track known behaviors over relatively long periods of time using the tactic data store 24 as an input source for known malicious or bad behaviors to identify, extract, or detect known tactics, which tactic data store 24 also can be supplemented with new tactics or variations of tactics identified by the tactic processor. For example, one known malicious tactic includes a technique referred to as "business email compromise" in which an adversarial actor steals a user's business email account information or otherwise accesses the user's business email account, and creates a forwarding rule that forwards emails, e.g., emails that match a certain subject line, to an external email address for obtaining specific emails sent to the user. Thus, for identification or extractions of such a tactic, the tactic processor 20 can track and map or match the series of known behaviors, such as the logging into an email account, creating a forwarding rule, and forwarding/sending emails to an external email address, e.g., as they occur over time, and when the end conditions for the tactic are met, can extract and/or identify these series of behaviors as a tactic, which can be forwarded to the tactic classifier 30, as discussed below.

FIG. 1 further shows that identified tactics 26 may become one or more inputs 28 for the tactic processor 22 in order to identify, extract, or detect one or more composite tactics, e.g., tactics composed of more than one individual tactics. For example, as indicated in FIG. 1, upon identification of one or more tactics, the identified tactics can be submitted to the tactic processor 20, and based on one or more of the identified tactics 26, or combinations of one or more of the identified tactics 26 and one or more of the identified behaviors 22, the tactic processor 20 can extract, identify, or detect one or more composite tactics (e.g., using mapping or matching of records in the tactic data store 24).

In addition, in some variations, identified behaviors 22 or identified tactics 26 also may become inputs 32 and 33, respectively, to the behavior processor 16 for assisting in the training and identification or extraction of one or more additional or composite behaviors, such as behaviors composed of more than a single behavior or behaviors composed of one or more behaviors and one or more tactics. For example, as indicated in FIG. 1, upon extraction, identification, or detection of the behaviors 22 with the behavior processor 16, the identified behaviors 22 can be submitted to the behavior processor 16 for extraction, identification, or detection of one or more composite behaviors, e.g., including one or more behaviors (e.g., by mapping or matching of records in the behavior data store 18). Furthermore, upon extraction, identification, or detection of the tactics 26, the identified tactics can be submitted to the tactic processor for identification, extraction, or detection of additional behaviors that include one or more tactics (e.g., mapping or matching can be used to compare the extracted/identified tactics, identified behaviors and/or datum, features, or characteristics of the data or data sets against the behavior data store 18).

According to embodiments of the present disclosure, behaviors can include (i) a single datum, (ii) more than one datum (iii) a behavior and one or more datum, (iv) more than one behavior, (v) one or more tactics and one or more datum, (vi) one or more tactics and one or more behaviors, or (vi) one or more tactics, one or more behaviors, and one or more datum. Also, tactics can include (i) a behavior, (ii) more than one behavior, or (iii) one or more tactics and one or more behaviors.

As also indicated in FIG. 1, the system 10 includes a tactic classifier 30 that receives identified tactics 26 as one or more inputs (e.g., upon identification of the one or more tactics and/or composite tactics, the tactic processor 20 can submit these to the tactic classifier 30). The tactic classifier 30 can process or analyze these identified tactics 26 according to the particular sequence of data comprising each identified tactic 26 and associated properties thereof. In some variations, data may be ranked according to severity or confidence based on metadata provided by data-providers 12, the behavior data store 18, and tactic data store 24. Furthermore, the tactic classifier 30 may employ a plurality of classification and threshold based technologies, such as statistical modeling, machine learning, etc., to classify malicious tactics based on the data including datum, features, or characteristics from the data producers, identified behaviors, and/or identified tactics. In one embodiment, the tactic classifier 30 can employ an anomaly detection machine learning algorithm, though other suitable algorithms can be used (e.g. machine learning, statistical, etc.), without departing from the scope of the present disclosure. Classifications or outputs from the tactic classifier 30 can be used to continuously update or train the tactic classifier 30 to help to improve the accuracy or efficacy of the tactic classifier 30 in classifying malicious tactics over time.

In one embodiment, outputted information or classifications 34 of tactics from the system 10 can be submitted to and consumed by a separate system or processor 36 designed to alert the system operator, users, etc. regarding the identification of tactics belonging to certain classes (i.e. adversarial actors). For example, if the tactic(s) are classified as tactics used by adversarial actors 34, the system % processor 36 can generate an alert, alarm, etc. to notify system defenders or users of possible malicious activity.

It will be appreciated that for simplicity and clarity the descriptions provided with respect to FIG. 1 are under the assumption of a "streaming" data model, where data is continuously provided by external sources, and processing and output is perpetually performed by the system 10. Equivalent functionality can be achieved in a "batch" manner, however, without departing from the scope of the present disclosure.

Figure 2A:
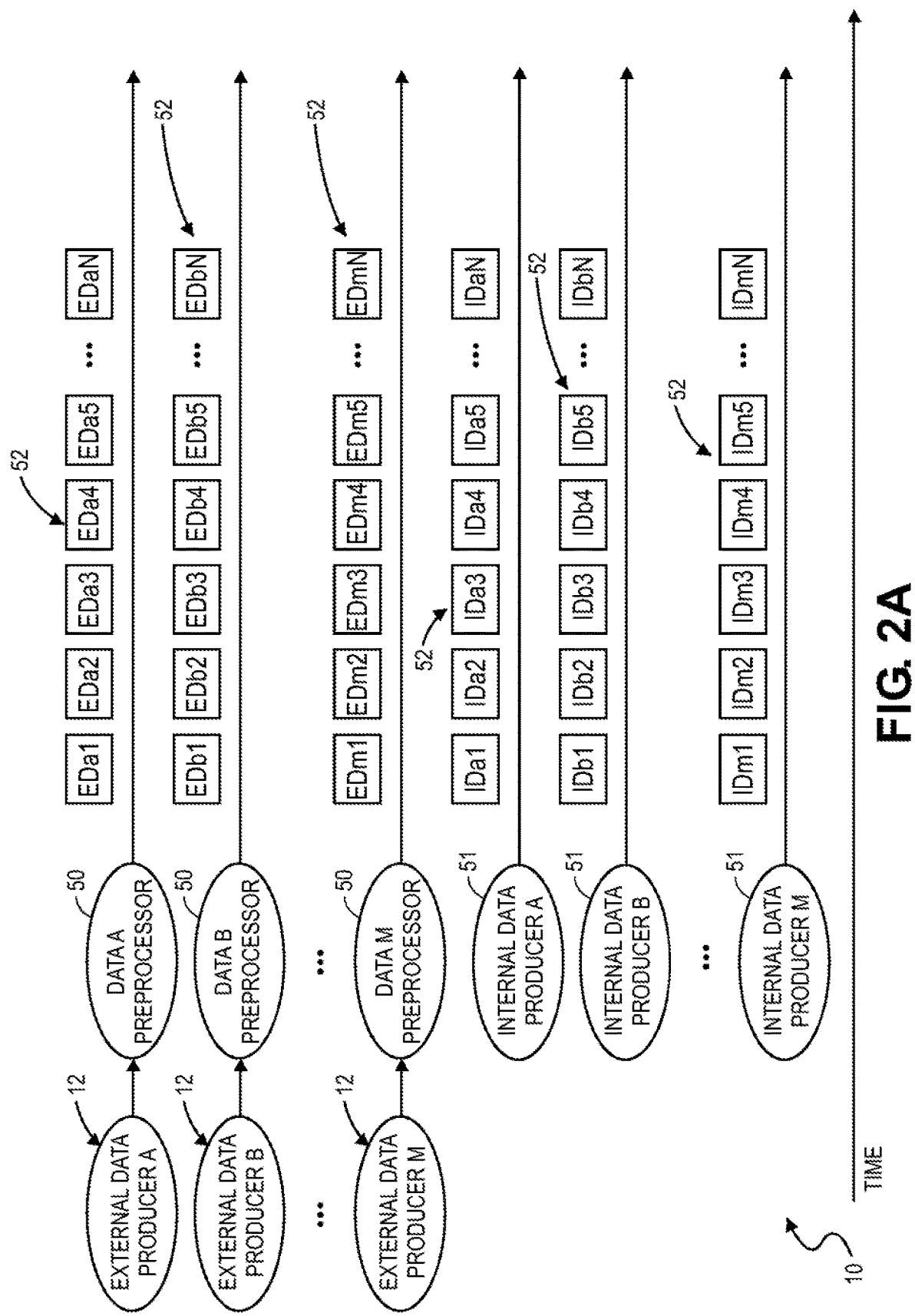
FIGS. 2A and 2B illustrate a process for behavior mapping according to one example of the present disclosure.
Figure 2B:
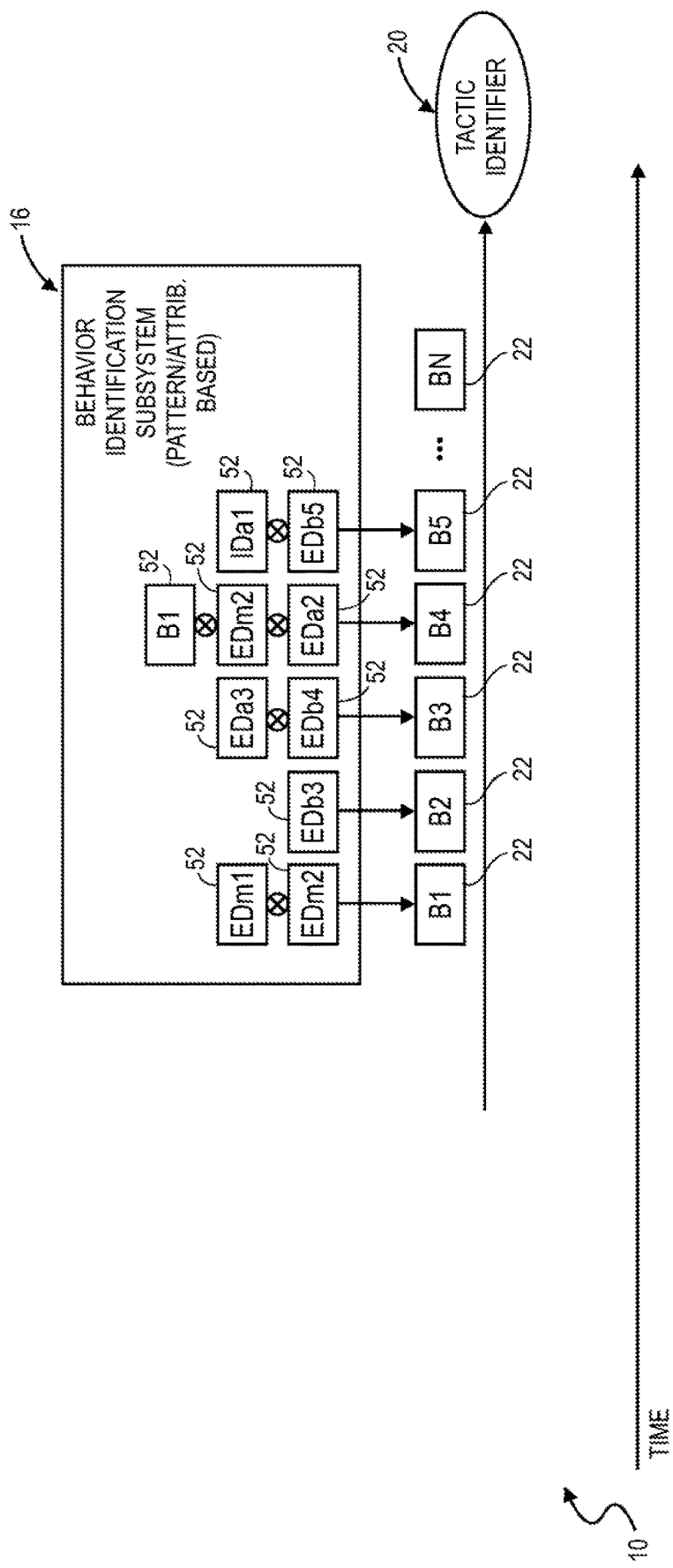

FIGS. 2A and 2B provide a schematic diagram for behavior processing, e.g., using the behavior processor 16, according to principles of the present disclosure, with behavior processing being shown over time, e.g., earlier times are shown to the left in FIG. 2A. As shown in FIG. 2A, external data-producers 12 emit data or data sets that are received by or advanced to the system 10, which data or data sets can be submitted or advanced to a pre-processor or a series of pre-processors 50 to be preprocessed to format the data or data sets for use in the system 10. The preprocessor(s) 50 can be a separate component in communication with the behavior processor 16, though the preprocessor(s) 50 also can be incorporated as a part of the behavior processor 16 without departing from the scope of the present disclosure. FIG. 2A further shows that data sources 51 internal to the system 10, such as the behavior processor 16, the tactic processor 20, etc., also will produce data for behavior processing. This internal data, however, may not require preprocessing.

As indicated in FIG. 2A, the data or data sets generally include specific datum, features, or characteristics 52 that are processed by the behavior processor 16 in sequence. For example, data including datum 52 from external data-producer B will be processed in the order EDb1, EDb2, EDb3 through EDbN, while data including datum 52 from internal data-producer A will be processed in the order IDa1, IDa2, IDa3 through IdaN.

Thereafter, as shown in FIG. 23, the behavior processor 16 uses the behavior data store 18 to identify or extract behaviors 22 (such as B1, B2, B3 through BN). For example, once the system 10 has observed the external datum EDm1 and EDm2, the combination of which exists in the behavior data store 18, behavior B1 will be identified. Furthermore, it can be seen that behavior B2 can be identified from the single datum EDb3, while behavior B3 can be identified from a datum 52, i.e., EDa3, originating from external data-provider A, and a datum 52, i.e., EDb4, originating from a different external data-provider B.

FIG. 2B further shows several types of composite behaviors. For example, as shown in FIG. 2B, behavior B4 is composed of an earlier behavior B1, as well as two datum 52, i.e., EDm2 and EDm5, from different external providers. Still further, behavior B5 is composed of a datum 52, i.e., IDa1, from an internal data-provider A, as well as a datum 52, i.e., EDb5, from an external provider B, as generally indicated in FIG. 2B. The identified behaviors 22 subsequently can be processed by the tactic processor 20 as shown in FIGS. 1 and 2B.

The constituent datum, features, or characteristics 52 of the behaviors generally are observed prior to the creation of each behavior (e.g., EDm1 and EDm2 occurred prior to the creation of B1). Otherwise, the vertical alignment of data in FIG. 2B does not imply that datum from multiple sources must be processed synchronously with datum from other sources, that any given source will "block" waiting for datum from another source, or any other inference related to the precise vertical alignment of datum.

Figure 3:
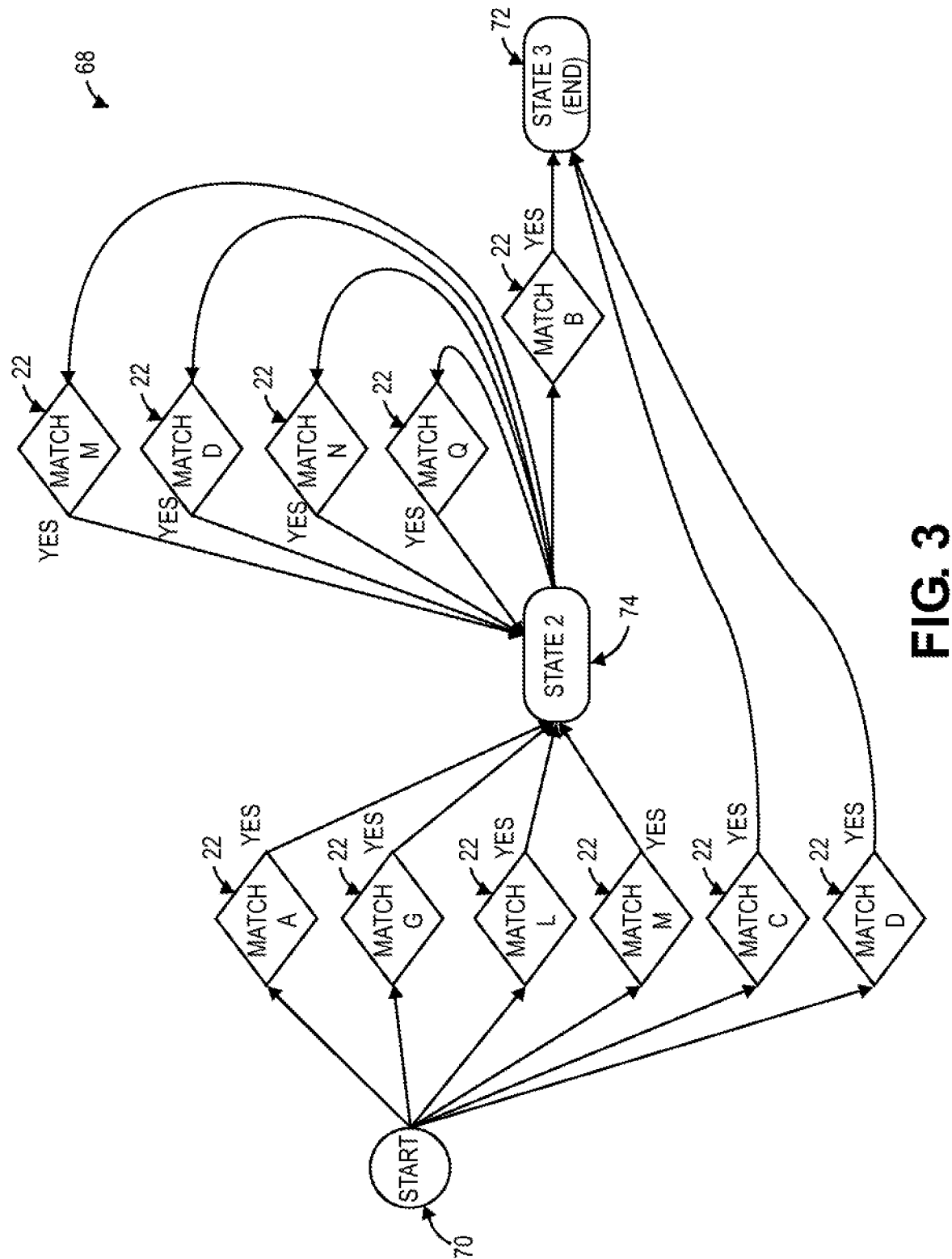
FIG. 3 shows a flow diagram for an example tactic according to the present disclosure.

According to embodiments of the present disclosure, tactics generally can be depicted using flowcharts, directed graphs, finite automata, etc., as generally shown in FIGS. 3 and 4A-4H. FIG. 3 depicts an exemplary tactic 68 shown as a flowchart. As shown in FIG. 3, the exemplary tactic 68 can include altering or changing a system or device from an initial or start state 70 (i.e., "State 1") to an end or final state 72 (i.e., "State 3"), and for example, the exemplary tactic 68 can include several individual behaviors 22 and several combinations of behaviors 22 that will change the system/device from this initial state 70 (i.e., "State 1") to this final state 72 (i.e., "State 3). In particular, some single behaviors 22 (e.g., behaviors C, D) will, on their own, directly change the system/device from the initial state 70 (i.e., "State 1") to the end state 72 (i.e., "State 3") to complete detection of tactic 68; and further, some behaviors (such as behaviors A, G, L, M) will change the system/device from the initial state 70 (i.e., "State 1") to an intermediate state 74 (i.e., "State 2"), with additional behaviors (such as behavior B) getting the system/device to end/final state 72 (i.e., "State 3) from this intermediate state 74 (i.e., "State 2") to complete detection of tactic 68.

In one example sequence, illustrated in FIG. 3, if behavior A is encountered, the "match A" decision can be taken and the flow will move to the intermediate state 74 (i.e., "State 2"), and then, if behavior D is encountered, the "match D" decision can be taken and the flow moves again/returns to the intermediate state 74 (i.e., "State 2"). At this point, if behavior B is encountered, "match B" decision can be taken and the tactic 68 can be completed (e.g., the system/device moves to the final/end state 72, i.e., "State 3"). Accordingly, as indicated in FIG. 3, the sequence of behaviors A, D, B will result in the flow reaching the final/end state 72 (i.e., "State 3"). However, other sequences of behaviors 22 also may reach the final state 72 (i.e., "State 3"), and therefore also exhibit the same approach depicted by this known tactic 68. For example, a set of valid sequences of behaviors 22 that can successfully reach the end state 72 (i.e., "State 3") include, but are not limited to: AMB, AB, ADDDB, GNDB, MB, MMB, C, and D. According to the present disclosure, if any of these sequences are identified by the tactic processor 20, the tactic 68 will be identified or extracted. It will be further understood from FIG. 3 that behaviors 22 may occur at various different positions in the sequence. For example, behavior M could cause a decision to be taken after the initial state 70 (i.e., "State 1") or after the intermediate state 74 (i.e., "State 2"), depending on when M is encountered in the sequence. Sequences of behaviors 22 may be ordered, but need not be adjacent as depicted in FIG. 2B.

In some variations, a single datum, behavior, or tactic may, by itself, have security relevance. In these cases, the single datum, behavior, or tactic is said to "anchor" the detection of a larger identified tactic. In the case where the larger tactic would not otherwise be detected, this "anchor" may cause the larger tactic to be detected or the anchor may influence attributes of a detection (e.g. increase confidence). For example, as shown in FIG. 3 and the sequence of behaviors ADDDQB and ADDDB both reach the end state 74 (i.e., "State 3") and traverse in a similar fashion. If the behaviors A, D and B are relatively benign, and only become marginally of interest because if this particular sequence, however, the addition of a security-relevant behavior, i.e., Q, may cause the sequence to be of significant interest.

Figure 4A:
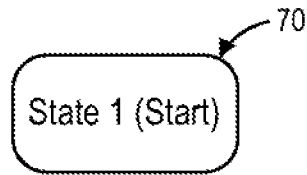
FIGS. 4A, 4B, 4C, 4D, 4E, 4F, 4G, and 4H show examples of tactic identification according to examples of the present disclosure.
Figure 4B:
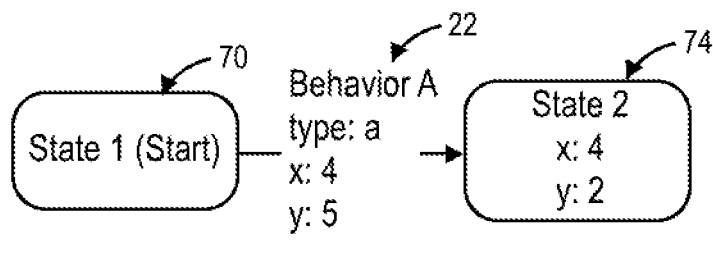
Figure 4C:
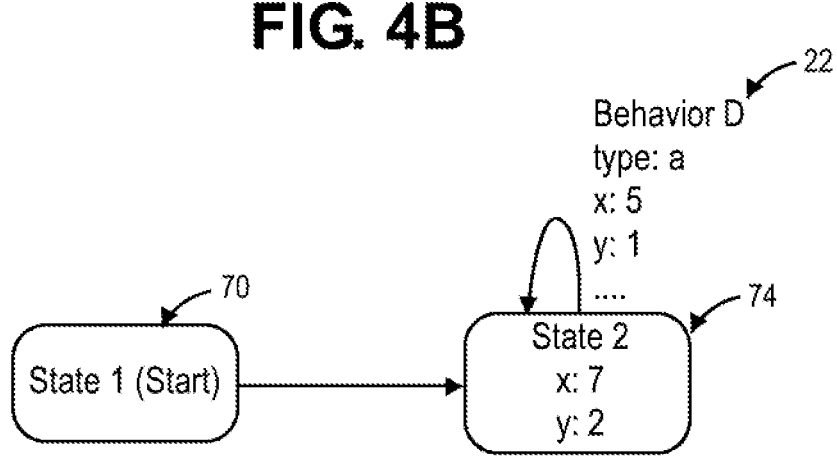
Figure 4D:
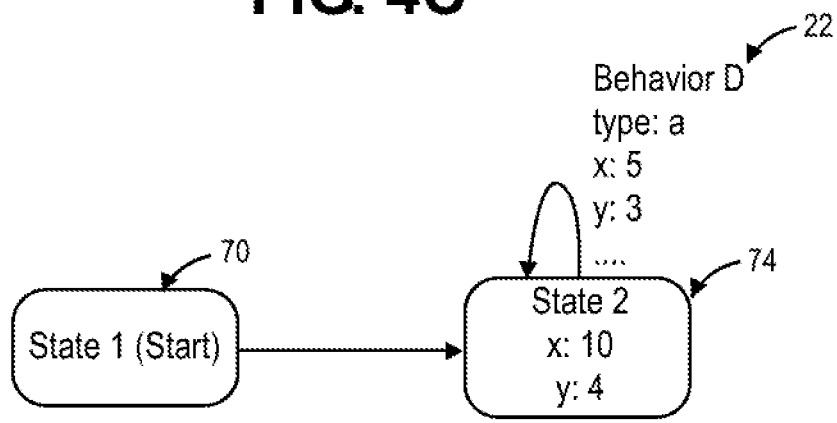
Figure 4E:
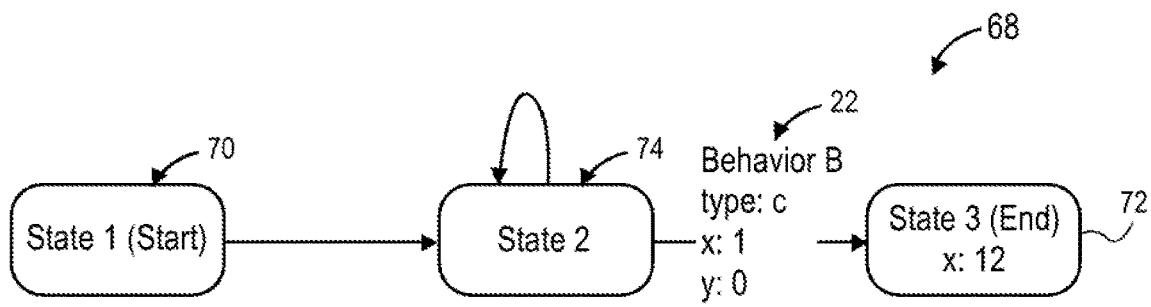

FIGS. 4A-4E provide an alternative, graphical depiction of the exemplary tactic 68, and depict an exemplar identification of this tactic 68 progressively depicted in sequent 4A-4E, via several behaviors 22. In FIG. 4A, the initial state 70 (i.e., "State 1") is shown. In FIG. 4B, it can be seen that behavior A processes and advances the graph to the intermediate state 74 (i.e., "State 2"). Behavior D is shown in FIG. 4C, and as shown in FIG. 4C, behavior D again advances to the intermediate state 74 (i.e., "State 2"). Similarly, a second instance of behavior D is processed in FIG. 4D, again advancing to the intermediate state 74 (i.e., "State 2"). Finally, as shown in FIG. 4E, when behavior B is processed, the graph advances to the final/end state 72 (i.e., "State 3") to complete the tactic 68 detection.

Figure 4F:
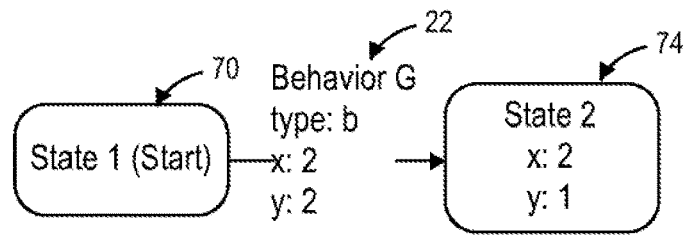
Figure 4G:
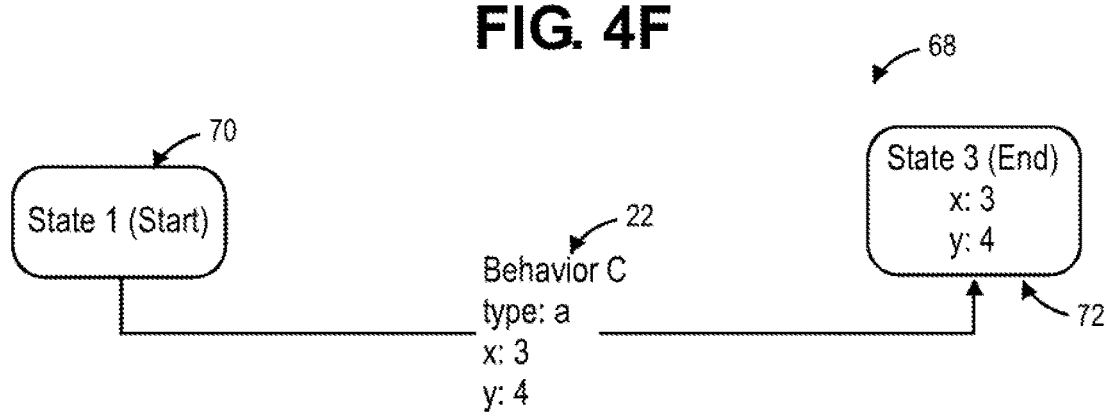

FIG. 4F depicts an alternate transition to the intermediate state 74 (i.e., "State 2"). That is, in FIG. 4F, a behavior G is processed to advance to the intermediate state 74 (i.e., "State 2"). FIG. 4G depicts a different transition where the processing of behavior C advances directly from the initial state 70 (i.e., "State 1") to the final/end state 72 (i.e., "State 3").

Figure 4H:
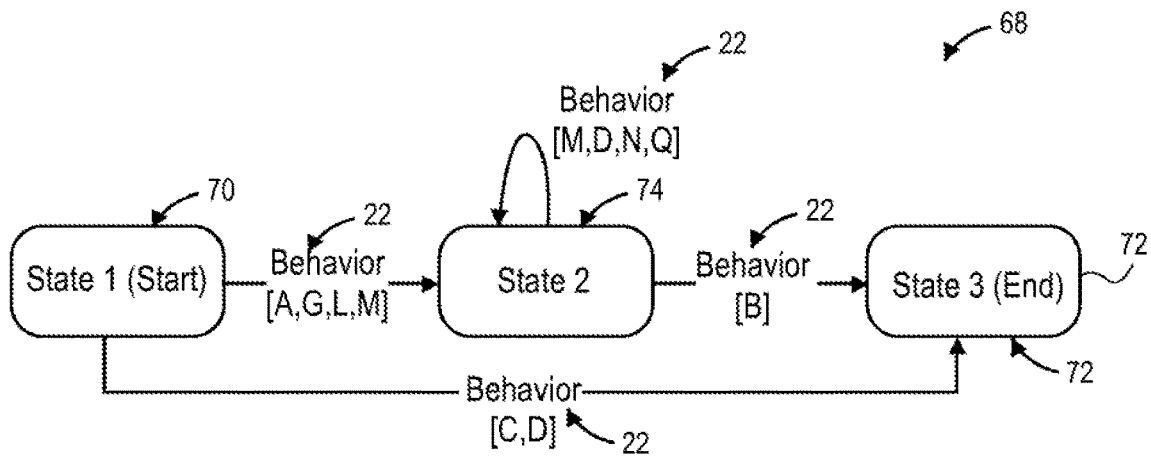

FIG. 4H is an exemplary depiction of a detection/development of the tactic 68. As shown in FIG. 4H, any of the behaviors 22 (A, G, L or M) will advance from the initial state 70 (i.e., "State 1") to the intermediate state 74 (i.e., "State 2"), whereas behaviors C or D (22) will advance directly from the intermediate state 74 (i.e., "State 2") to the final/end state 72 (i.e., "State 2"). Further, from the intermediate state 74 (i.e., "State 2") any of behaviors M, D, N or Q will advance/return again to the intermediate state 74 (i.e., "State 2") (however, updating any attributes as needed). However, from the intermediate state 74 (i.e., "State 2") behavior B will advance from the intermediate state (i.e., "State 2") to the end state 72 (i.e., "State 3"). As a result, in one example, tactic 68 might be partially encoded using a regular expression similar to the end state 72 (i.e., "State 3"), such as: (([AGLM]) ([MDNQ])*B)([CD]) to detect tactic 68.

Unlike FIG. 3, FIGS. 4A-4E depict attributes of behaviors 22, some of which may relate to and influence attributes of states in the graph. Behaviors 22 may have zero or more attributes, any of which may influence the identification or subsequent classification of a tactic. In FIGS. 4A-4E, the value of attribute "x" influences the value of attribute "y" in each state. This influence is applied through a function which may vary for each attribute for each tactic representation. Attributes may be used as part of the tactic definition, dictating when state transitions occur, and can be passively passed through to the output of the system, used to derive some property about the instance of a particular tactic identification (e.g. a "confidence value"), or for some other purpose, without departing from this disclosure.

In some variations, the system 10 incorporates the resolution, confidence, and/or fidelity of datum, features, or characteristics, provided by data-producers 12. These properties may be incorporated as attributes in FIGS. 4A-4E, incorporated in pre-processors 50 illustrated in FIG. 2A, or elsewhere. In some variations, a single external event may cause datum, features, or characteristics to be provided by more than one data-producer 12, and these datum, features, or characteristics, may have differing values for resolution, confidence and/or fidelity. In cases such as this, the system 10 may consider and act upon each datum, feature, or characteristic, independently (e.g., identifying more than one behavior) or act upon them dependently (e.g., identifying one behavior, and further influencing that behavior due to the addition datum, features, or characteristics).

Figure 5:
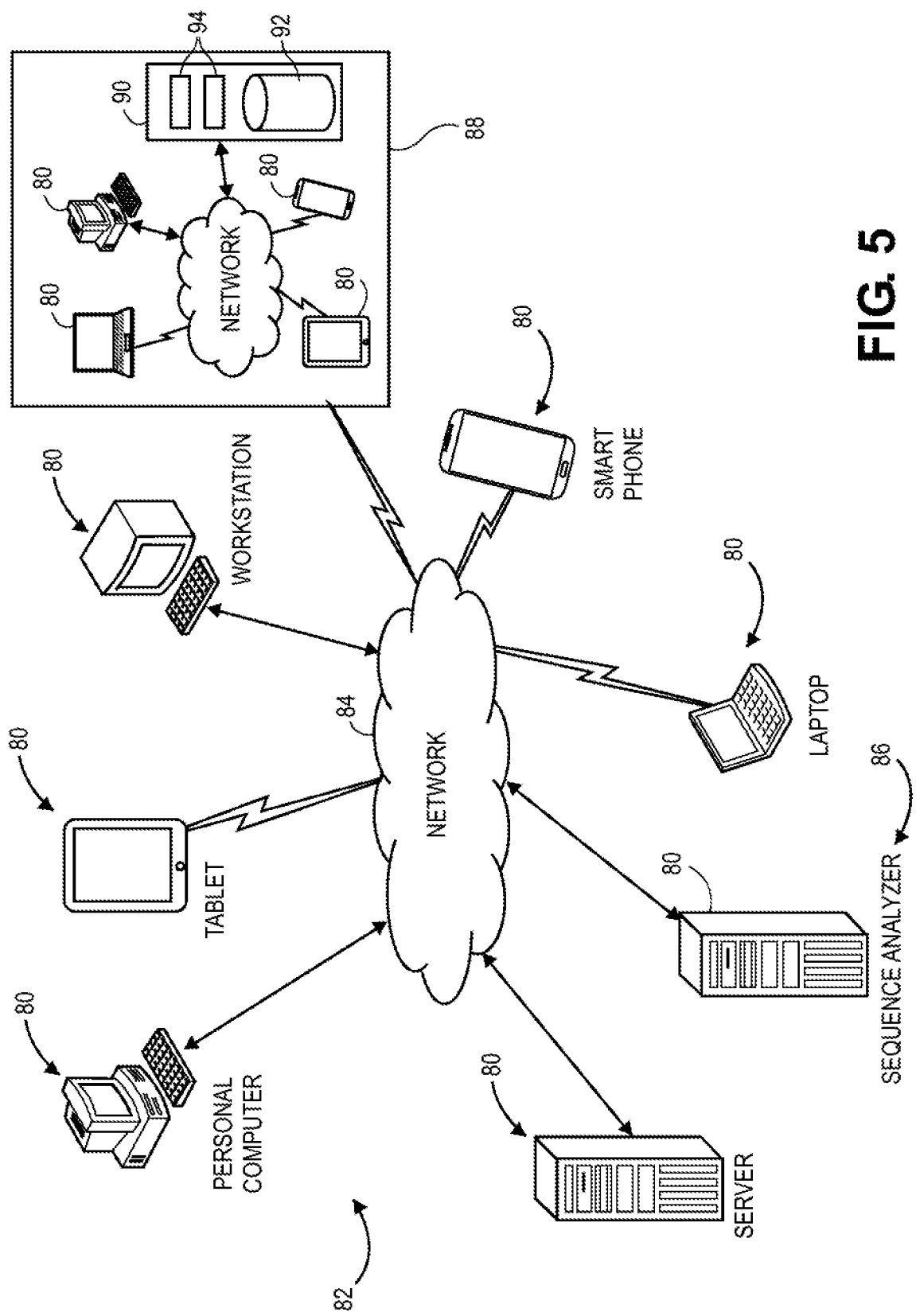
FIG. 5 shows a networked system of information handling systems according to principles of the present disclosure.

According to embodiments of the present disclosure, the various components of the system 10 (such as the behavior processor 16, the tactic processor 20, the tactic classifier 30, etc., shown in FIG. 1) can include computer programmable instructions, workflows, etc. that can be stored in memory and executed or accessed by one or more processors (generally referred to as "a processor") of one or more information handling systems 80, e.g., as generally shown in FIG. 5. It will be understood that in some instances all of the components (e.g., behavior processor 16, tactic processor 20, tactic classifier 30, etc.) shown in FIG. 1 can be implemented as a part of an individual information handling system/device, e.g., when there are sufficient processor and memory computing resources therein. In other instances, however, the system 10 may be deployed across a variety of information handling systems/device (i.e. deployment of a system irrespective of physical presence or "cloud" infrastructure). Furthermore, although FIG. 1 shows only a single behavior processor 16, tactic processor 20, and tactic classifier 30 for executing its various processes, the system 10 can include any suitable number of behavior processors 16, tactic processors 20, and/or tactic classifiers 30, without departing from the scope of the present disclosure.

For purposes of this disclosure, an information handling system 80 (FIG. 5) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, a touchscreen and/or a video display. The information handling system also may include one or more buses operable to transmit communications between the various hardware components.

As shown in FIG. 5, in some embodiments, the system 10 can include a networked system 82 of information handling systems/devices 80 or other communicable systems/devices. A network 84 may provide data communications among the information handling systems/devices 80, which can include workstations, personal computers, smart cellular telephones, a personal digital assistants, laptop computers, servers, and other suitable devices. The network 84 can include a private or public network, such as a local area network, or other suitable network(s), such as the Internet or another wide area network, virtual personal network, peer to peer filing sharing system, and/or other suitable communication lines, or combinations thereof. FIG. 5 also indicates that the linked or networked information handling systems 80 may include one or more monitoring devices 86 communicatively coupled to the network 84. The monitoring device(s) 86 can be managed by a Managed Security Service Provided ("MSSP").

In one embodiment, the monitoring device(s) 86 may include a server or sequence analyzer or other client suitable computing device that has a processor and a memory or other suitable storage. The memory can include a random access memory (RAM), read only memory (ROM), and/or other non-transitory computer readable medium. The monitoring device(s) 56 further typically will be operable to store and execute computer readable instructions to continuously monitor, in real-time, activity at each networked system, for example, activity of the information handling systems 80 connected to network 84. The monitoring device(s) 86 can ingest/aggregate information or data logs related to activities of the information handling systems 80 and can provide these ingested/aggregate data logs or information or data related thereto to by the system 10 for processing thereby. In addition, or in the alternative, the system 10 can include a data center 88, such as a data center 88 management by an MSSP, with a plurality of networked information handling systems 80, e.g., including one or more servers 90 with at least one memory 92 and one or more processors 94 for receiving information or data logs related to activities of the information handling systems 80 of system 82. These information/data logs can include raw or normalized information or data that can be provided to the system 10 for processing thereby.

Figure 6A:
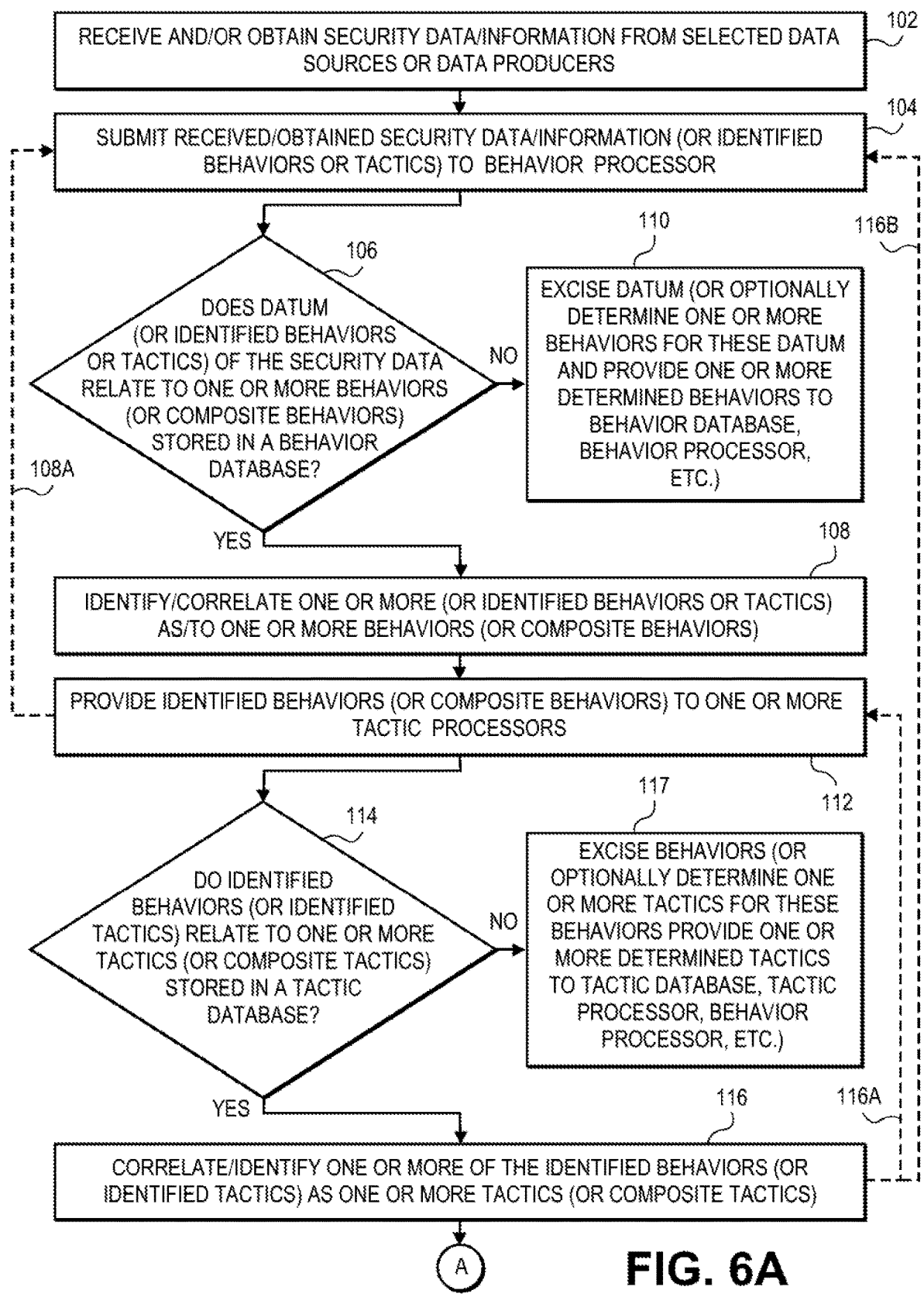
FIGS. 6A and 6B show a process or method for hierarchical modeling or detection of security threats or malicious activities according to one example of the present disclosure.
Figure 6B:
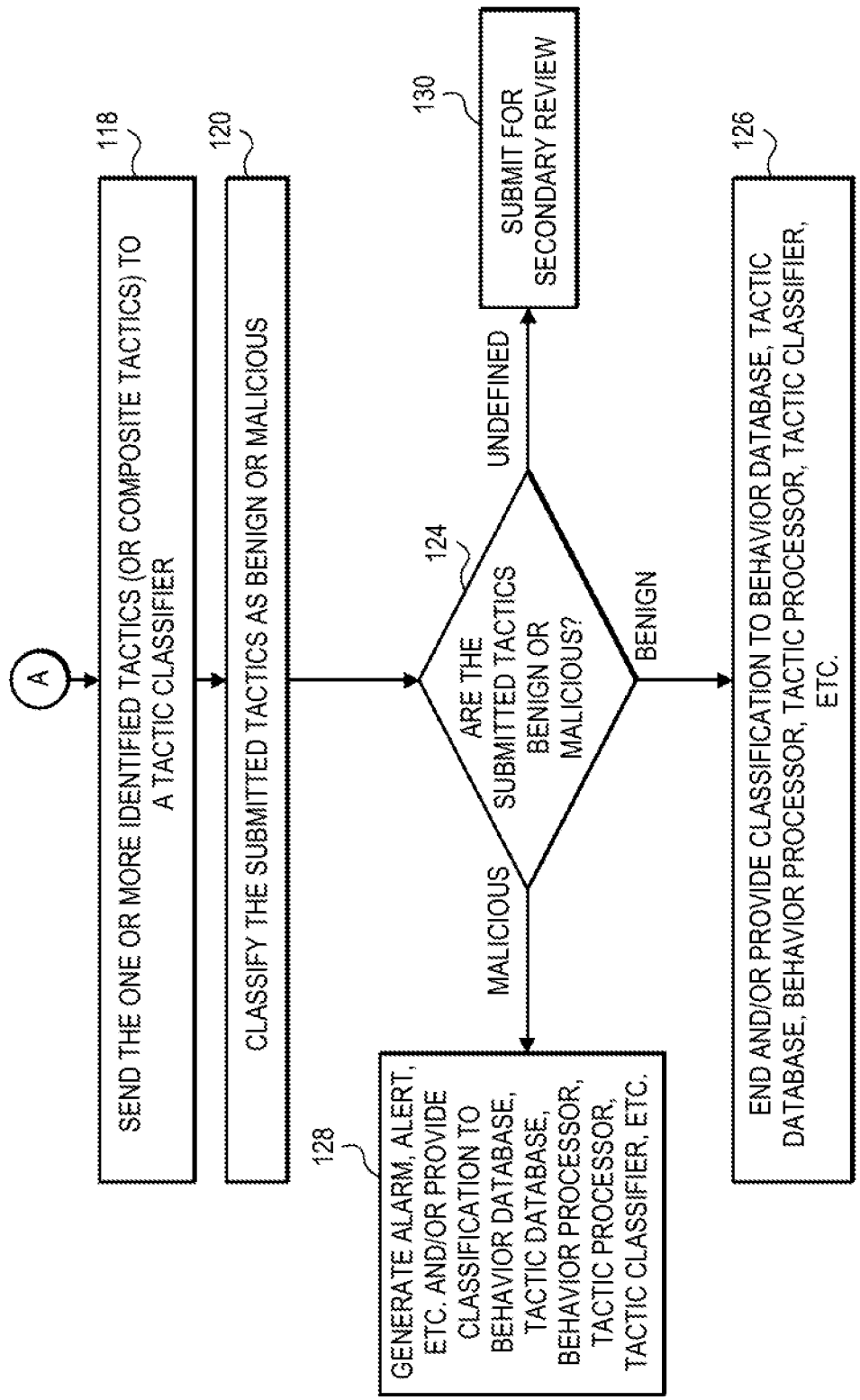

FIGS. 6A and 6B show a flow diagram for a method or process for hierarchical detection and classification of malicious actions or security threats in accordance with the present disclosure. As shown in FIG. 6A, at 102, security data, data sets, or other information from selected data sources or data producers can be received or otherwise obtained by the system 10, which received or obtained security data can be submitted or advanced to the behavior processor 16 (at 104).

Thereafter, at 106, using the behavior processor 16, it can be determined whether one or more datum, features, or characteristics, or combinations thereof included in the received security data relates to one or more behaviors stored in a behavioral data store 18 (e.g., by mapping or matching datum in the received or obtained security data against records in the behavior data store 18).

If one or more known behaviors are identified by the behavior processor 16 at 106, then the one or more behaviors can be correlated to the one or more datum at 108. As FIG. 6A further indicates, at 108A, identified behaviors also can be provided or submitted to the behavior processor 16 to determine if the security data includes one or more composite behaviors, e.g., behaviors made up of more than one behavior.

In some variations, as shown at 110, datum that does not relate to known behaviors in the behavioral data store 18 can be excised and thus not considered during further processing by the system 10. Optionally, however, for datum that does not correlated to one or more known behaviors in the behavior data store 18, one or more behaviors can be determined (e.g., using machine learning, statistic modeling, etc.) if/when appropriate and these behaviors can be provided to the behavioral data store 18, behavior processor 16, etc.

Thereafter, at 112, the identified behaviors can be provided to the tactic processor 20, and the tactic processor 20 can determine whether the identified behaviors or combinations thereof relate to one or more tactics stored in a tactic data store 24 (at 114), e.g., by mapping or matching the identified behaviors against records in the tactic data store 24.

If one or more known tactics from the tactic data store 24 relate to the identified behaviors, the one or more identified behaviors can be identified or correlated as one or more tactics (at 116). As FIG. 6A further indicates at 116A, the identified tactics can be provided to the tactic processor 20 for identification of any composite tactics, that is, tactics including more than one tactic. Furthermore, as shown at 116B, the identified tactics also can be provided to the behavior processor 16 to identify any additional behaviors that include one or more tactics.

If one or more of the identified behaviors do not correspond to known behaviors in the tactic data store 24, such behaviors can be excised, e.g., are not submitted to the tactic classifier 30, (at 117), though in some variations these behaviors can be submitted to the tactic processor 20, e.g., to identify composite tactics that include one or more tactics in combination with these behaviors, without departing from the scope of the present disclosure. Optionally, in some variations, one or more tactics for these behaviors also can be identified, generated, etc. (e.g., using machine learning/ statistical modeling, etc.) and provided to the tactic data store 24, the tactic processor 20, the behavior processor 16 and other data stores/devices (at 108, 116A, or 116B).

FIG. 6B shows that the one or more identified tactics can be advanced or submitted to the tactic classifier 30 (at 118) to be classified as malicious, benign, etc. (at 120) by the tactic classifier 30.

In some variations, the process/method may take various actions based upon the classification of the one or more tactics (as shown at 124). For example, if the tactic classifier 30 classifies the tactics as benign, the process may end and/or the classification can be provided to the behavior data store, tactic data store, behavior extractor, tactic processor, tactic classifier, etc., or one or more data stores in combination therewith, for use in future applications of the system (at 126).

Alternatively, if the tactics are determined to be malicious (at 124), an alarm alert or notification can be generated and/or the classification can be provided to the behavior data store, tactic data store, behavior extractor, tactic processor, tactic classifier, etc., or one or more data stores in combination therewith, (at 128). For example, labeled data including the classification of the one or more identified tactics, identified behaviors, or datum from the security data can be used to train/update the tactic classifier 30 for later classifications or future iterations thereof.

If the one or more tactics are undefined, however, they may be submitted for a secondary review, e.g., by an MSSP or security researcher, etc. to determine if they are malicious or benign or if the tactic classifier 30 needs further training, updating, etc. (at 130).

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A system for detection of security threats or malicious actions, comprising:
   one or more processors and at least one memory having stored therein a plurality of instructions that when executed by the one or more processors implement one or more components configured to:
   receive data from one or more data producers;
   submit the data to a behavior processor;
   identify one or more behaviors from the data based on datum, features, characteristics, or combinations thereof, included in the one or more identified behaviors, using the behavior processor;
   provide the one or more identified behaviors to at least one tactic processor;
   identify one or more tactics based on a determination that the one or more identified behaviors relate to one or more tactics stored in a tactic data store and influence applied based upon any identified attributes of the behaviors using the at least one tactic processor, wherein the influence applied based on the identified attributes may vary for each identified attribute applicable to the one or more identified tactics, wherein the influence is used to determine a confidence value of an identification of a particular tactic, and wherein the tactics comprise a plurality of known behaviors ordered according to a selected relationship therebetween;
   submit the one or more identified tactics to a tactic classifier;
   determine, using the tactic classifier, whether the one or more identified tactics are indicative of one or more security threats or malicious actions based on a particular sequence of data comprising each of the one or more identified tactics and one or more of the identified behaviors determined to be related thereto; and
   in response to a determination indicative that maliciousness of the one or more identified tactics is unidentifiable, determine, based on a response from a secondary review, maliciousness of the one or more identified tactics.

2. The system of claim 1, wherein the one or more components are further configured to generate an alert or alarm to notify a user of a security threat or malicious action if the one or more identified tactics are determined to be indicative of one or more security threats or malicious actions.

3. The system of claim 1, wherein the received data includes a system log, user metadata, infrastructure data, or combinations thereof.

4. The system of claim 1, wherein to identify the one or more behaviors, the behavior processor is configured to map the one or more datum, features, or characteristics included in the data against known behaviors stored in a behavior data store.

5. The system of claim 1, wherein to identify the one or more tactics, the at least one tactic processor is configured to map the one or more identified behaviors against known tactics stored in a tactic data store.

6. The system of claim 1, wherein the one or more components are further configured to identify, using the behavior processor, one or more additional behaviors based on the one or more datum, features, or characteristics; the one or more identified behaviors; or combinations thereof.

7. The system of claim 1, wherein the one or more components are further configured to extract or identify, using the behavior processor, one or more additional behaviors based on the one or more identified tactics.

8. The system of claim 1, wherein the one or more components are further configured to identify, using the at least one tactic processor, one or more additional tactics based on the one or more identified behaviors, the one or more identified tactics, or combinations thereof.

9. The system of claim 1, wherein the tactic classifier includes a statistical model or a machine learning model.

10. The system of claim 1, wherein the selected relationship between the plurality of known behaviors of the identified tactics comprises a chronological relationship, parent-child relationship, network port source and destination match relationship, or combination thereof.

11. A method for detection of one or more security threats or malicious actions, comprising:
    receiving data from one or more data producers;
    providing the data to a behavior processor;
    identifying, by the behavior processor, a plurality of behaviors from the data based on datum, features, or characteristics included therein;
    providing the plurality of identified behaviors to a tactic processor;
    identifying, by the tactic processor, one or more tactics, based on a determination that the plurality of identified behaviors relate to one or more tactics stored in a tactic data store wherein each of the one or more tactics comprise a plurality of known behaviors ordered according to a selected relationship therebetween;
    determining, by the tactic processor, a composite tactic based on a combination of at least one of the one or more identified tactics and one or more of the identified behaviors;
    submitting one or more of the one or more identified tactics or the composite tactic to a tactic classifier; and
    determining, by the tactic classifier, whether the one or more of the one or more identified tactics or the composite tactic are indicative of the one or more security threats or malicious actions based on a sequence of data comprising each of the one or more identified tactics and one or more of the identified behaviors determined to be related thereto.

12. The method of claim 11, further comprising:
    generating and providing an alert or alarm to notify a user of a security threat or malicious action if the one or more identified tactics are determined to be indicative of one or more security threats or malicious actions.

13. The method of claim 11, wherein the identifying the one or more behaviors comprises:
    mapping, by the behavior processor, the one or more datum, features, or characteristics included in the data against known behaviors stored in a behavior data store.

14. The method of claim 11, wherein the identifying the one or more tactics comprises:
    mapping, by the tactic processor, one or more identified behaviors against known tactics stored in a tactic data store.

15. The method of claim 11, further comprising:
identifying, by the behavior processor, one or more additional behaviors based on the one or more datum, features, or characteristics; the plurality of identified behaviors; or combinations thereof.

16. The method of claim 11, further comprising:
identifying, by the behavior processor, one or more additional behaviors based on the one or more identified tactics.

17. The method of claim 11, further comprising:
identifying, by the tactic processor, one or more additional tactics based on the plurality of identified behaviors, the one or more identified tactics, or combinations thereof.

18. The method of claim 11, wherein the tactic classifier includes a statistical model or a machine learning model.

19. The method of claim 11, wherein the received data includes a system log, user metadata, infrastructure data, or combinations thereof.

20. The method of claim 11, wherein a determined composite tactic is comprised of a plurality of individual tactics.

\* \* \* \* \*